US008245997B2

(12) United States Patent
Baratta

(10) Patent No.: US 8,245,997 B2
(45) Date of Patent: Aug. 21, 2012

(54) DRILL STAND

(75) Inventor: Anthony Baratta, Oak Park, CA (US)

(73) Assignee: Husqvarana Professional Outdoor Products Inc., Charlotte, NC (US)

(*) Notice: Subject to any disclaimer, the term of this patent is extended or adjusted under 35 U.S.C. 154(b) by 279 days.

(21) Appl. No.: 12/740,994

(22) PCT Filed: Nov. 2, 2007

(86) PCT No.: PCT/US2007/083507
§ 371 (c)(1),
(2), (4) Date: Apr. 30, 2010

(87) PCT Pub. No.: WO2009/058156
PCT Pub. Date: May 7, 2009

(65) Prior Publication Data

US 2010/0264292 A1 Oct. 21, 2010

(51) Int. Cl.
*F16M 11/00* (2006.01)

(52) U.S. Cl. ..................... 248/676; 248/176.3; 408/199; 408/238; 409/235

(58) Field of Classification Search .................. 248/637, 248/644, 664, 669, 676, 176.3; 308/146, 308/199, 238; 309/235, 286
See application file for complete search history.

(56) References Cited

U.S. PATENT DOCUMENTS

| | | | | | |
|---|---|---|---|---|---|
| 3,464,655 | A | * | 9/1969 | Schuman | 248/651 |
| 4,684,303 | A | * | 8/1987 | Erdt et al. | 409/235 |
| 4,836,494 | A | * | 6/1989 | Johnsen | 248/669 |
| D617,355 | S | * | 6/2010 | Baratta | D15/132 |
| D629,026 | S | * | 12/2010 | Baratta | D15/132 |

FOREIGN PATENT DOCUMENTS

| | | | |
|---|---|---|---|
| DE | 10230460 | A1 | 1/2004 |
| GB | 1235962 | A | 6/1971 |
| WO | 95/06714 | A | 3/1996 |

OTHER PUBLICATIONS

International Search Report and Written Opinion, Application No. PCT/US2007/083507, Feb. 18, 2009, pp. 1-16.

* cited by examiner

*Primary Examiner* — Bradley Duckworth
(74) *Attorney, Agent, or Firm* — Novak Druce + Quigg LLP

(57) ABSTRACT

Drill stand (1) including a base plate (2), a carriage (3) arranged to be able to carry a drill motor and a drill column (4) which is pivotally mounted to a front part (5) of the base plate. The drill column is supported by a back support (7) located in a longitudinal direction rear of the drill column and is pivotally mounted to a back part (8) of the base plate, and a back side of the drill column facing the back support (7) is arranged as a track (10) having lateral wings (11, 11'), a right side wing (11) and a left side wing (11'). A clamping arrangement fastened to both of the back support and the track (10) enabling them to be fixed to each other in different positions along the track by clamping.

8 Claims, 6 Drawing Sheets

DRILL STAND

TECHNICAL FIELD

The present invention relates to a drill stand designed to be used with a drill motor and a core drill and to normally be fixedly fastened to a floor or wall using either an expander bolt or vacuum. In the latter case a vacuum cap and gasket is applied to the expander bolt aperture. The drill stand preferably has a back support clamped to its drill stand.

BACKGROUND OF THE INVENTION

When core drilling in concrete, asphalt, brickwork or similar building materials, a drill stand is usually used. The drill stand is mounted via anchor bolt(s) or vacuum. Usually the drilling is done in a floor or a wall using a drill bit to prepare a hole with a diameter of usually 100-200 mm, and in extreme cases up to 600 mm. Often it is required to drill either a straight or an angled hole. Therefore a special kind of drill stand has a drill column that can be tilted, usually from zero degrees to forty-five degrees. The drill column is often fixed with a tiltable back support that is slidably connected to the drill column and is locked to the column in a suitable position by a clamping arrangement.

Husqvarna DS 160 C is a drill stand of this type. It has a clamping mechanism comprising a screw to be tightened on the rear side of its drill column; i.e., from the back side of the drill stand. This is somewhat awkward as all other important settings of the drill stand are managed from the side of the drill stand.

OBJECTS OF THE INVENTION

An object of the invention is to provide a drill stand having an improved clamping mechanism and a more reliable system for vacuum locking.

SUMMARY OF THE INVENTION

At least one of the above mentioned objects and/or problems are met by providing a drill stand in accordance with the invention having the characteristics appearing from the appended claims. The drill stand, according to the invention, is thus essentially characterised in that the clamping arrangement comprises a center clamp having a flange part fitting in the elongate opening and having protrusions, right and left, from the flange part intended to contact the inside forward surfaces, right and left, when clamping. The clamping arrangement further comprises an outer clamp right and an outer clamp left, each having at least a lateral contact surface arranged to contact the respective outside rear surface when clamping, each outer clamp being arranged outside of the center clamp and having outer angled contact elements intended to cooperate with center angled contact elements to provide a longitudinal backwards motion of the center clamp in relation to the outer clamps when a clamping element is pressing the outer clamps laterally together against the center clamp making its protrusions press against the inside forward surfaces, and making the lateral contact surfaces of the outer clamps press against the outside rear surfaces; i.e., providing clamping in a longitudinal direction. In this way a clamping in the longitudinal direction can be achieved from the side of the drill stand. This is a distinct advantage compared to the prior art drill stand mentioned above.

In a further improved embodiment, the outer clamps, right and left, each have a longitudinal contact surface, right and left, contacting a longitudinal contact surface of the track or drill column, right and left when clamping therefore creating a clamping also involving clamping in a lateral direction in addition to the clamping in the longitudinal direction. This provides an especially good clamping where six contact surfaces of the track are involved. A further improvement is a more reliable vacuum mounting where a slot guard (32) is provided around the expander bolt aperture(s). The slot guard is preferably made of steel and is more scratch resistant than the base plate, which is usually made of aluminium. Thereby, the slot guard provides a more reliable seal for the vacuum locking than the prior art solutions. This is because the top surface of the slot guard is provided with a gasket for sealing between the slot guard and a vacuum cap. Further features and advantages are presented in the description of preferred embodiments with the help of the drawing figures.

BRIEF DESCRIPTION OF THE DRAWINGS

The invention will be described in the following in closer detail by means of various embodiments thereof with reference to the accompanying drawings wherein like numeral references have been used in the various drawing figures to denote corresponding components.

DESCRIPTION OF PREFERRED EMBODIMENTS

Figure 1:
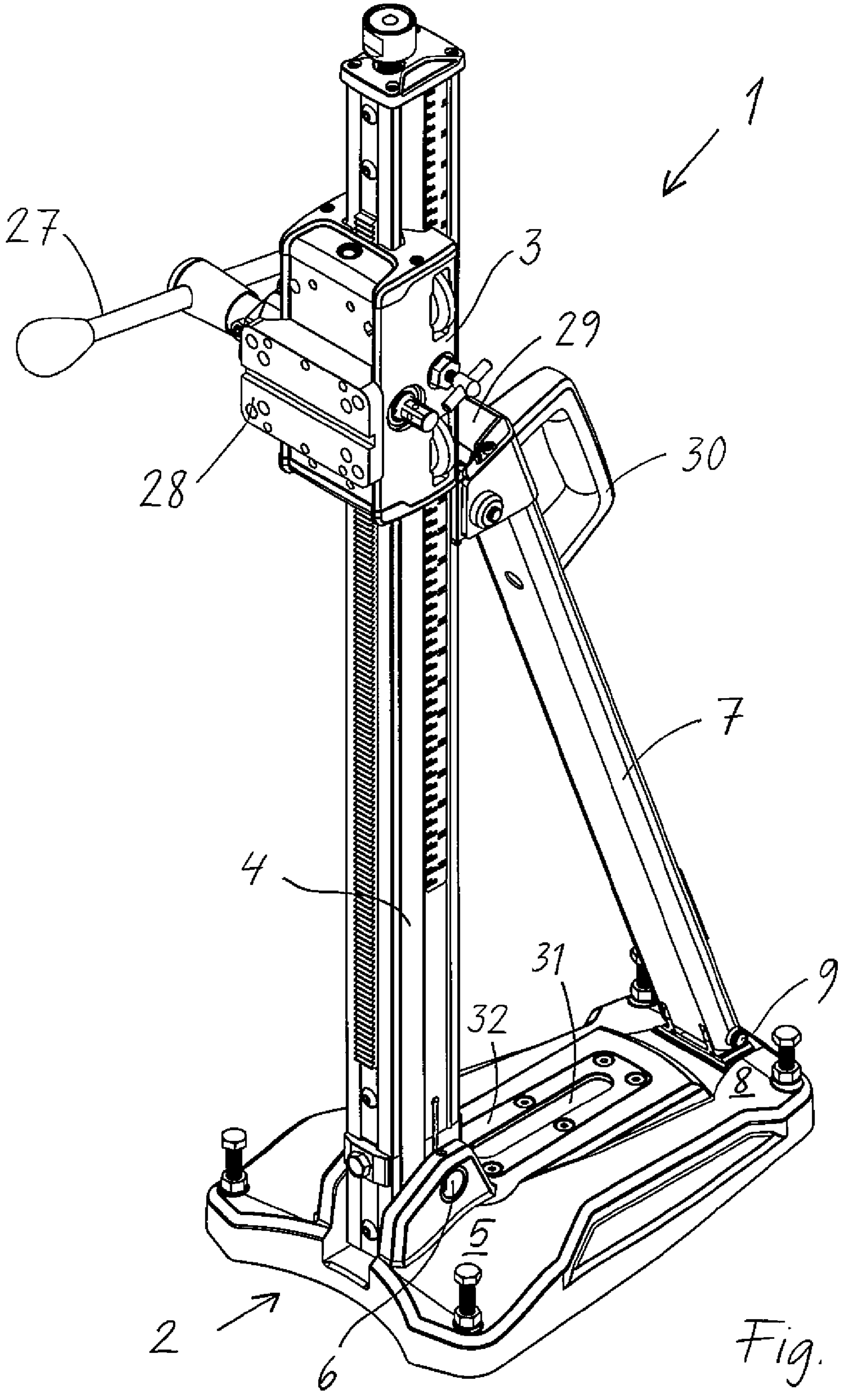
FIG. 1 is a perspective view of a drill stand according to the present invention.

FIG. 1 shows a drill stand 1 according to one preferred embodiment of the present invention. The drill stand 1 comprises a base plate 2, which is adapted to be fastened to a floor or a wall, either by using an expander bolt or using a vacuum system. Also, the drill stand comprises a carriage 3, arranged on a drill column 4 and adapted to carry a drill motor. The carriage 3 is provided with a feeder handle 27 for moving the carriage along the drill column 4 and a motor connection part 28 for attachment of the drill motor. The drill column 4 is pivotally mounted to a front part 5 of the base plate 2 and turns around a drill column axle 6. Also, the drill column 4 is supported by a back support 7, which is pivotally mounted to a back part 8 of the base plate 2 and turns around a back support axle 9. A longitudinal direction is defined as a direction running through the centers of the drill column 4 and the back support 7 either from the front to the back part of the base plate, or vice versa. The drill column axle 6 and the back support axle 9 are essentially parallel and run in a lateral direction; i.e., lateral in relation to the longitudinal direction. The back support 7 is attached to the drill column 4 by means of a clamping arrangement 29. On the rear side of the back support 7 a carry handle 30 for transportation of the drill stand 1 is provided.

The base plate 2 is provided with an expander bolt aperture 31, extending in a longitudinal direction and used for fastening the base plate 2 in a floor or in a wall. The aperture 31 is arranged such that an anchor bolt is anchored to the floor or wall and can extend from the floor or wall and up through the aperture 31. The base plate 2 can be fastened to the floor by means of a nut, which is screwed on to the protruding part of the anchor bolt and tightened against the base plate 2. Alternatively, a vacuum lock can be used. A slot guard 32 is provided around the expander bolt aperture and sealingly applied to the base plate 2. The slot guard 32 is made of steel and is more scratch resistant than the base plate 2, which is usually made of aluminium. Thereby the slot guard 32 provides a more reliable seal for the vacuum locking than the prior art solutions. This is because the top surface of the slot guard is provided with a gasket 33 for sealing between the slot guard and a vacuum cap 34 when using vacuum locking (see FIG. 2). Preferably, a surface coating is provided on at least the top surface of the slot guard to provide improved scratch resistance. For this, a hard metal coating like nickel can be used.

Figure 2:
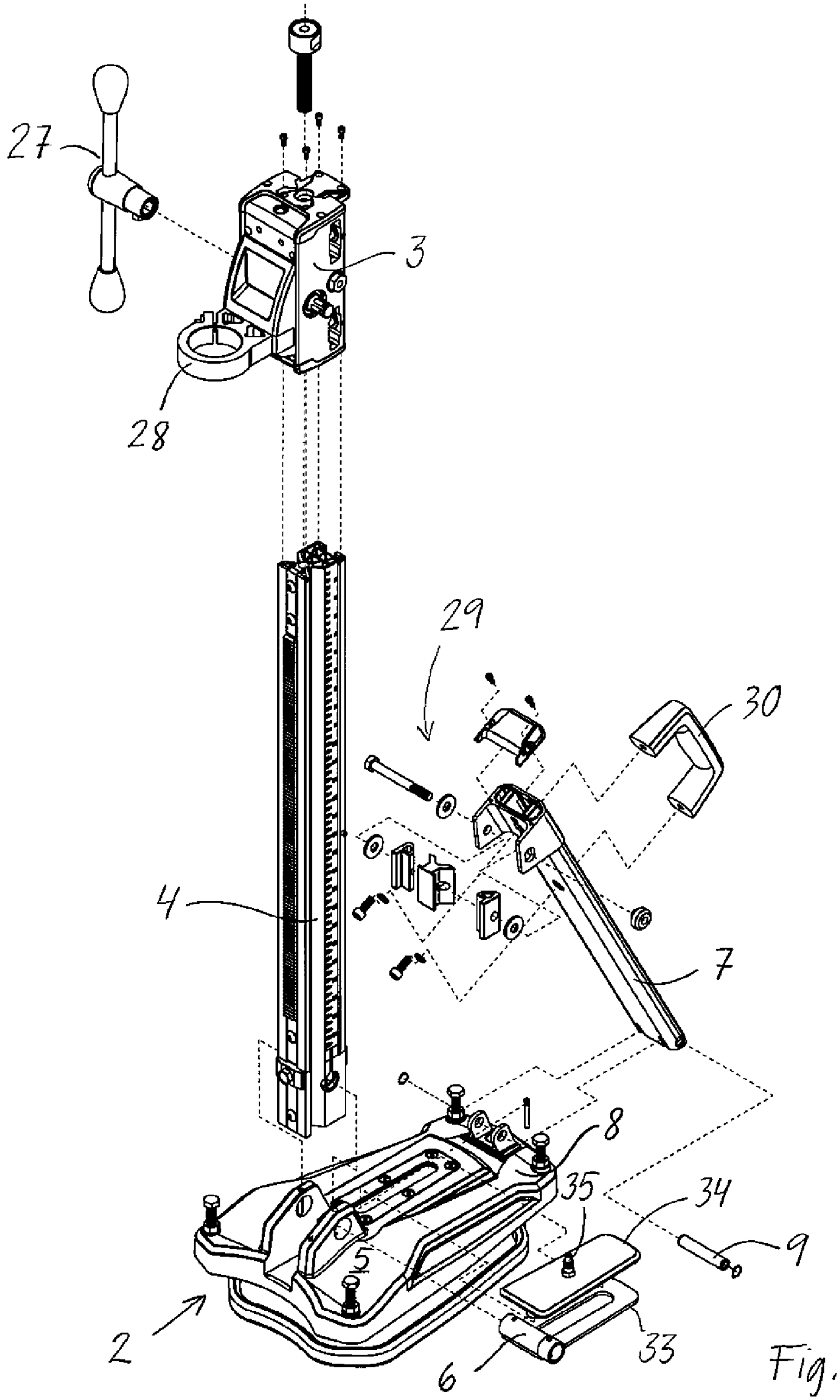
FIG. 2 is an exploded perspective view of a very similar drill stand as shown in FIG. 1, but with a different carriage.

FIG. 2 shows an exploded view of the drill stand 1 depicted in FIG. 1. In addition to the components shown in FIG. 1, this FIG. 2 also depicts the gasket 33, the vacuum cap 34 and a vacuum quick disconnect 35 which are used for obtaining a vacuum locking of the base plate 2 against a surface.

Figure 3:
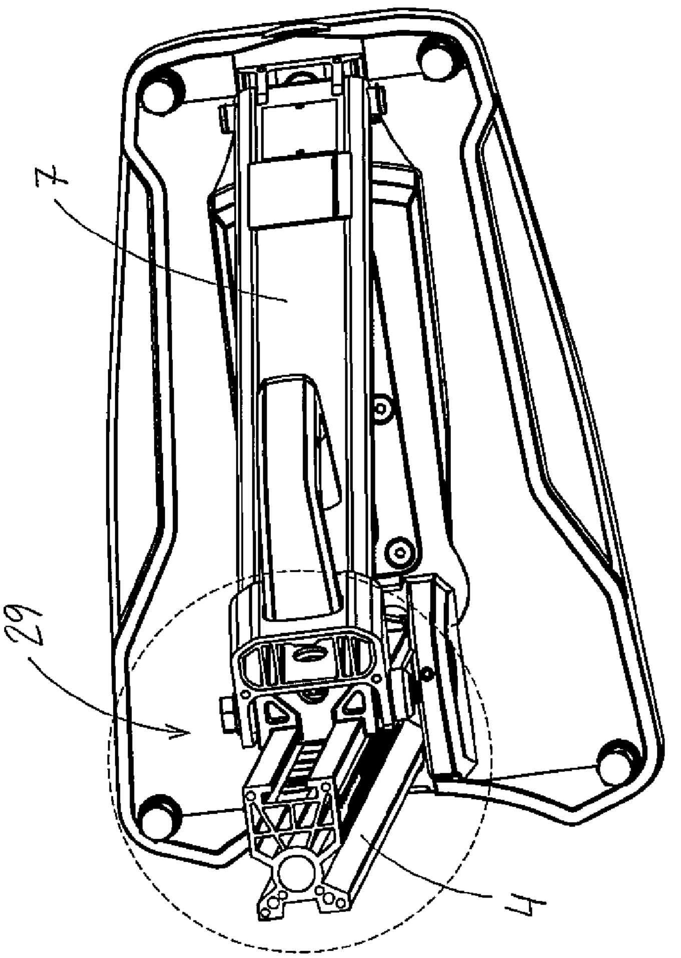
FIG. 3 is a perspective view of a drill stand according to the present invention as seen from above.

FIG. 3 shows that the back support 7 is attached to the drill column 4 by means of a clamping arrangement 29.

Figure 4:
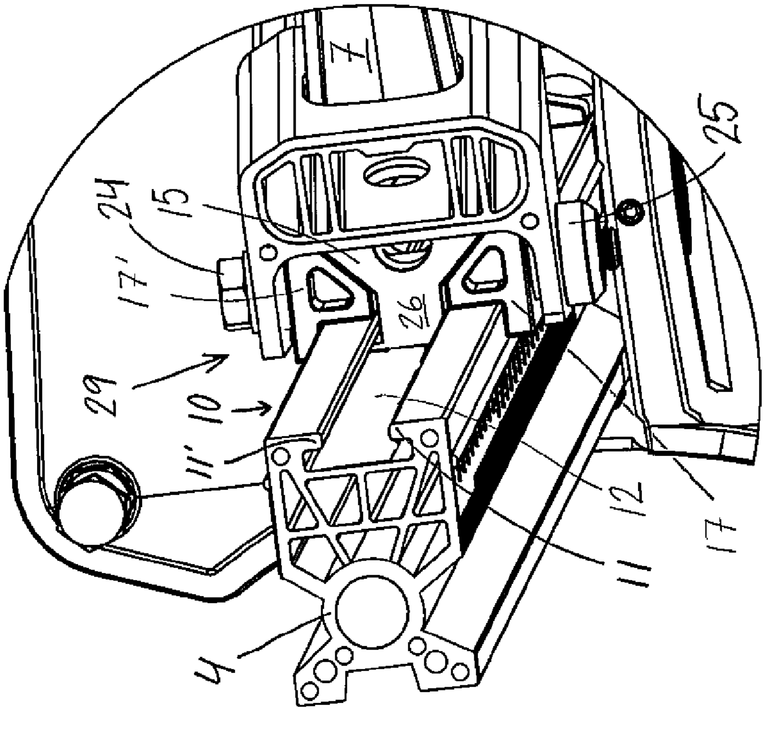
FIG. 4 is an enlarged view of the encircled area in FIG. 3 showing the clamping arrangement between the back support and the drill column.

FIG. 4 shows the clamping arrangement 29 between the back support 7 and the drill column 4 The back side of the drill column 4 is arranged as a track 10 having lateral wings 11, 11', a right wing 11 and a left wing 11', as seen from the front side of the drill stand 4. Each wing 11, 11' extends laterally from outside and inwards, but are separated by an elongate opening 12. The clamping arrangement 29 comprises a center clamp 15, which has a flange part 26 fitting in the elongate opening of the drill column, and two outer clamps, right 17 and left 17'. A clamping element 24, 25 is provided for pressing the outer clamps 17, 17' laterally together against the center clamp. The clamping arrangement 29 is connected both to the back support 7 and to the track 10, so as to fix the back support 7 to the drill column 4 in different positions along the track 10 by clamping.

Figure 5:
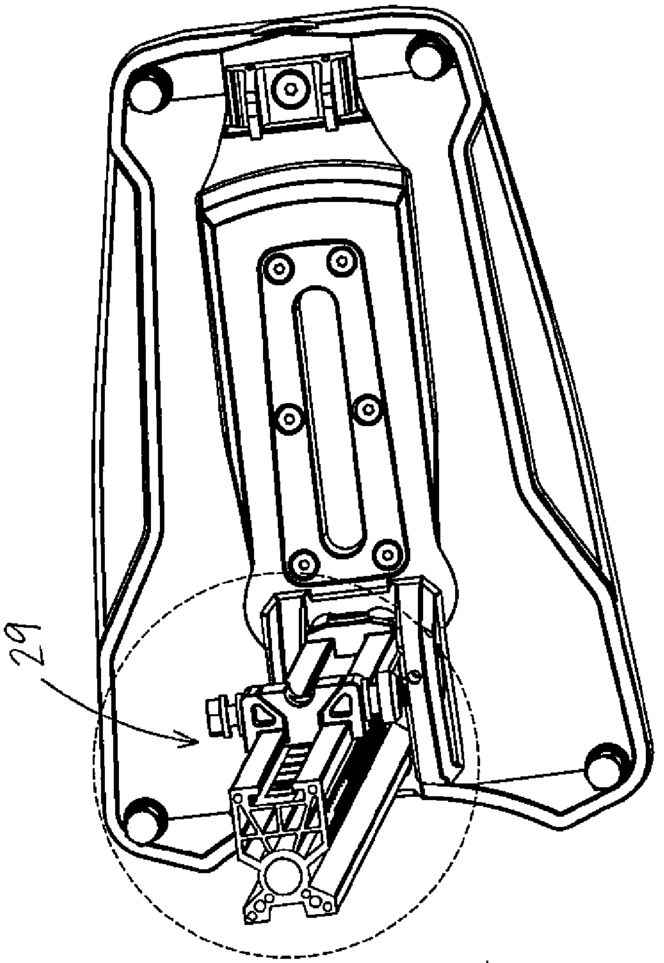
FIG. 5 is a perspective view of the drill stand in FIG. 3 as seen from above, but where the back support has been removed.

FIG. 5 shows a perspective view of the drill stand where the back support has been removed to more clearly show the clamping arrangement 29.

Figure 6:
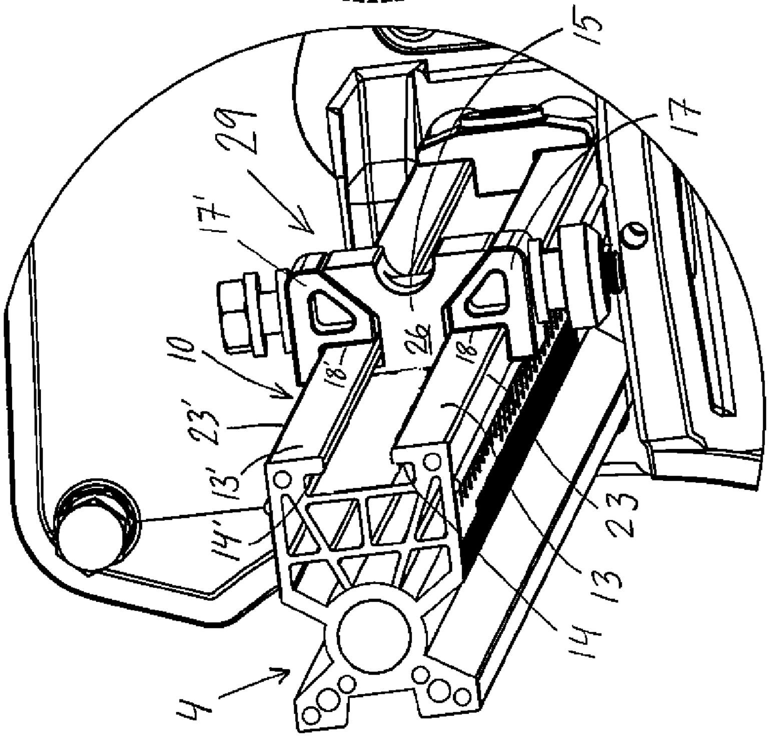
FIG. 6 is an enlarged view of the encircled area in FIG. 5 showing the clamping arrangement without the back support.
Figure 7:
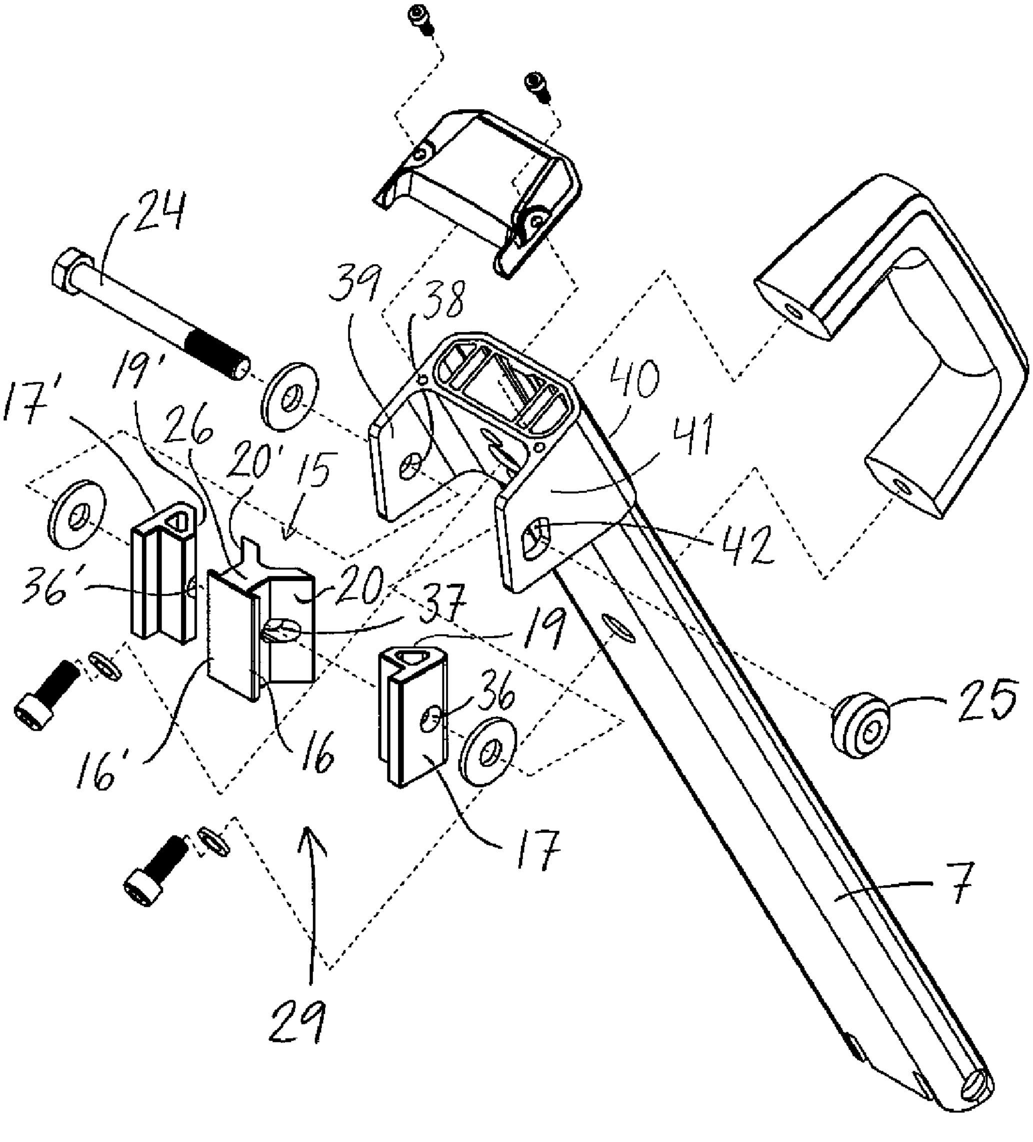
FIG. 7 is an enlarged exploded perspective view of the clamping arrangement and the back support of the drill stand shown in FIG. 2.
Figure 8:
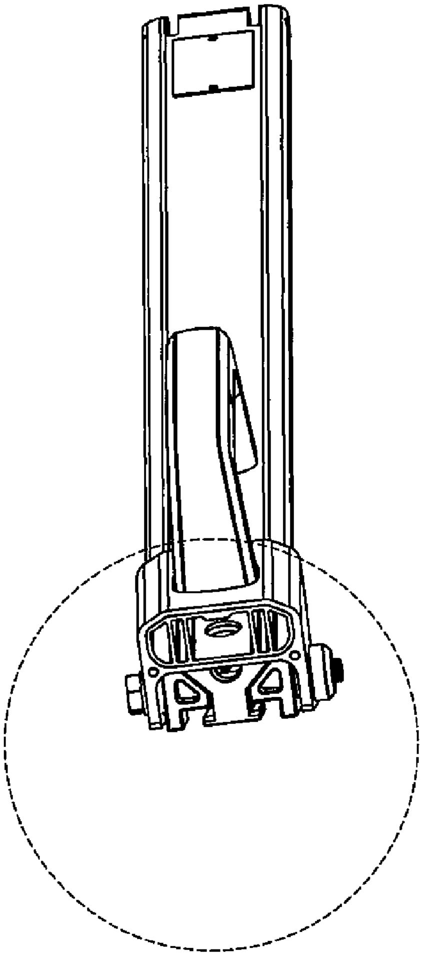
FIG. 8 is a perspective view of the back support and the clamping arrangement attached to this, as seen from above.
Figure 9:
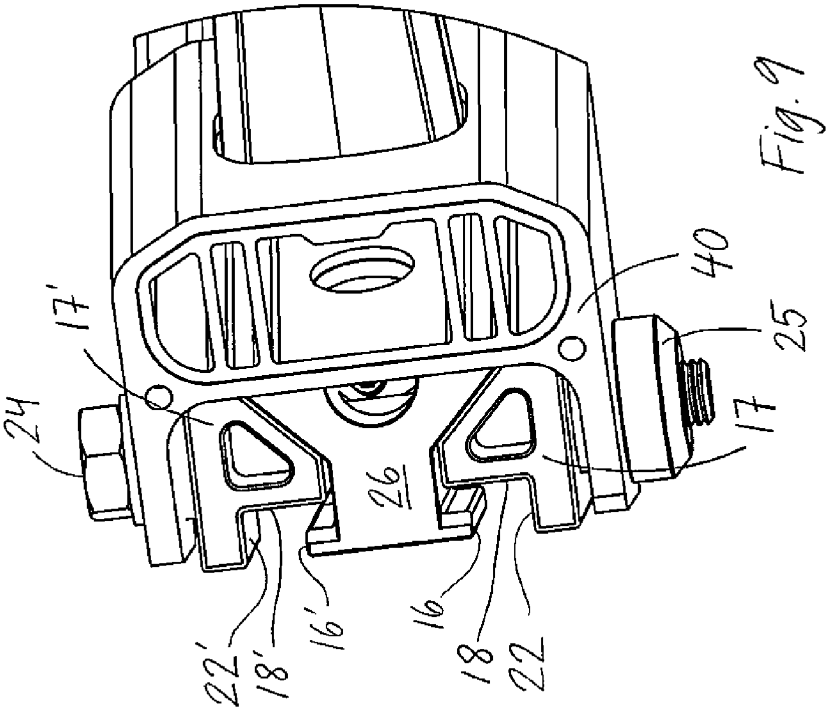
FIG. 9 is an enlarged view of the encircled area in FIG. 8 showing the clamping arrangement attached to the back support.

FIG. 6 shows the clamping arrangement 29 mounted on the drill column 4. FIG. 7 shows the clamping arrangement 29 and the back support 7 in an exploded view. FIG. 9 shows the clamping arrangement mounted in the back support 7. By comparing FIGS. 6, 7 and 9 the following description is best understood.

Each of the outer clamps 17, 17' has a lateral contact surface 18, 18', arranged to contact the respective outside rear surface 13, 13' of the track 10. Each outer clamp 17, 17' is arranged outside of the center clamp 15 and has an outer angled contact element 19, 19', intended to cooperate with center angled contact elements 20, 20' arranged on the center clamp 15. Preferably, the outer angled contact elements 19, 19' and the center angled contact elements 20, 20' are provided in the form of angled surfaces, i.e. surfaces that neither run in a longitudinal nor in a lateral direction, but in an intermediate direction. However, it should be noted that in alternative embodiments either the center angled contact elements 20, 20'or the outer angled contact elements 19, 19' could be provided in the form of something else than angled surfaces. For example, one or both of the center angled contact elements 20, 20' could be provided as having a contact area in the form of a bump of various shape. Also the contact area could be part of a rotatable body like a roller; e.g., using ball or roller bearings to reduce friction. And of course all this could also apply to one or both of the contact areas of the outer angled contact elements 19, 19'. Preferably, the outside rear surfaces 13, 13' as well as the inside forward surfaces 14, 14' of the track 10 run in an essentially lateral direction.

The center clamp 15 has protrusions, right 16 and left 16', extending laterally from the flange part 26 and intended to contact the inside forward surfaces 14, 14' of the track 10. The outer clamps, right and left 17, 17' have longitudinal contact surfaces, right and left 22, 22' contacting a longitudinal outside contact surface, right and left 23, 23' of the track 10 or drill column 4.

When the clamping element 24, 25 presses the outer clamps 17, 17' together in a lateral direction against the center clamp 15, the outer angled contact elements 19, 19' of the outer clamps cooperate with center angled contact elements 20, 20', providing a longitudinal backwards motion of the center clamp 15 in relation to the outer clamps 17, 17'. Thereby, the protrusions 16, 16' of the center clamp 15 are pressed against the inside forward surfaces 14, 14' and the lateral contact surfaces 18, 18' of the outer clamps are pressed against the outside rear surfaces 13, 13'. This way a clamping in a longitudinal direction is provided. If the outer clamps 17, 17' are also provided with longitudinal contact surfaces 22, 22', a clamping also in the lateral direction is possible. This provides a further improved embodiment having clamping in both a longitudinal and a lateral direction. Therefore, when the outer clamps 17, 17' are pressed together, the longitudinal contact surfaces 22, 22' of the outer clamps are pressed against the outside contact surfaces 23, 23' of the track 10 or the drill column 4, providing a clamping in a lateral direction.

Preferably, the clamping element 24, 25 comprises a clamping screw 24 and a lock nut 25. The clamping screw 24 is adapted to be fastened to the back support 7 and to run through holes 36, 36' in the outer clamps 17, 17' and through a hole 37 in the center clamp 15. The lock nut 25 is arranged to press against either of the outer clamps 17, 17', i.e. the nut could be located either on the right or left side of the drill stand.

The clamping screw 24 can be fastened to the back support 7 by being led through a clamping screw hole 38 in a first tongue 39 of a clamping fork 40 and further on through a lock nut aperture 42 in a second tongue 41 of the fork, and being secured in a lock nut 25. The lock nut aperture 42 is adapted to prevent the nut 25 from rotating but also to enable it to at least partly move through the aperture 42 and press against either of the outer clamps 17, 17'.

The clamping element 24, 25 could also be a tensioning device with a rod having a head in one end and quick tensioner in the other, like a cam rotatable around an axis lateral to the length axis of the rod and the cam supplied with a handle for quick tensioning without tools.

The invention claimed is:

1. Drill stand comprising a base plate, a carriage arranged to be able to carry a drill motor and a drill column which is pivotally mounted to a front part of the base plate, said drill column being supported by a back support which is located in a longitudinal direction rear of said drill column and is pivotally mounted to a back part of the base plate, and a back side of the drill column facing the back support is arranged as a track having lateral wings, a right side wing and a left side wing, as seen from the front side of the drill stand, and each wing extending laterally from outside and inwards, but being separated by an elongate opening, each lateral wing having an outside rear surface, right and left and an inside forward surface, right and left, and a clamping arrangement is fastened both to the back support and to the track enabling them to be fixed to each other in different positions along the track by clamping, wherein the clamping arrangement comprises a center clamp having a flange part fitting in the elongate opening and having protrusions, right and left, from the flange part intended to contact the inside forward surfaces, right and left, when clamping, the clamping arrangement further comprising an outer clamp right and an outer clamp left each having at least a lateral contact surface arranged to contact the respective outside rear surface when clamping, each outer clamp being arranged outside of the center clamp and having outer angled contact elements intended to cooperate with center angled contact elements to provide a longitudinal backwards motion of the center clamp in relation to the outer clamps when a clamping element is pressing the outer clamps laterally together against the center clamp making its protrusions press against the inside forward surfaces, and making the lateral contact surfaces of the outer clamps press against the outside rear surfaces, i.e providing a clamping in a longitudinal direction.

2. Drill stand according to claim 1, wherein the outer clamps, right and left, each have a longitudinal contact surface, right and left, contacting a longitudinal contact surface of the track or drill column, right and left when clamping therefore creating a clamping also involving clamping in a lateral direction in addition to the clamping in the longitudinal direction.

3. Drill stand according to claim 1, wherein the drill column turns around a drill column axle and the back support turns around a back support axle, and both axles are essentially parallel and run in a lateral direction.

4. Drill stand according to claim 1, wherein at least one of the outer angled contact elements and the center angled contact elements is an angled surface, i.e. a surface that neither runs in a longitudinal nor in a lateral direction but in an intermediate direction.

5. Drill stand according to claim 1, wherein both the outer angled contact elements and the center angled contact elements have angled surfaces.

6. Drill stand according to claim 1, wherein the clamping element comprises a clamping screw, fastened to the back support and running through holes in the outer clamps and through a hole in the center clamp, and a lock nut arranged to press against either of the outer clamps.

7. Drill stand according to claim 6, wherein the clamping screw is fastened to the back support by being led through a clamping screw hole in a first tongue of a clamping fork and through a lock nut aperture in a second tongue of the fork and secured in a lock nut, the lock nut aperture being adapted to prevent the nut from rotating but enable it to at least partly move through the aperture and press against either of the outer clamps.

8. Drill stand according to claim 1, wherein the inside forward surfaces and the outside rear surfaces of the track run in an essentially lateral direction.

* * * * *